US010158600B1

(12) United States Patent
Croke et al.

(10) Patent No.: US 10,158,600 B1
(45) Date of Patent: *Dec. 18, 2018

(54) EMAIL HANDLING FOR A CONTACT CENTER

(71) Applicant: SHORETEL, INC., Sunnyvale, CA (US)

(72) Inventors: Darren Croke, Durango, CO (US); Asim Parekh, San Jose, CA (US); Eric Lockhart, Cupertino, CA (US)

(73) Assignee: MITEL NETWORKS, INC., Mesa, AZ (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/875,872

(22) Filed: Oct. 6, 2015

Related U.S. Application Data

(63) Continuation of application No. 13/162,881, filed on Jun. 17, 2011, now Pat. No. 9,171,290.

(51) Int. Cl.
| | |
|---|---|
| *G06F 15/16* | (2006.01) |
| *H04L 12/58* | (2006.01) |
| *G06Q 10/10* | (2012.01) |
| *G06Q 10/06* | (2012.01) |
| *H04M 3/523* | (2006.01) |
| *H04M 3/493* | (2006.01) |
| *H04M 3/51* | (2006.01) |

(52) U.S. Cl.
CPC ...... *H04L 51/34* (2013.01); *G06Q 10/063114* (2013.01); *G06Q 10/107* (2013.01); *H04L 51/02* (2013.01); *H04M 3/4936* (2013.01); *H04M 3/5125* (2013.01); *H04M 3/5235* (2013.01)

(58) Field of Classification Search
CPC ............. H04M 3/5125; H04M 3/4936; H04M 3/5235; G06Q 10/107
USPC .................................. 370/352; 709/206, 202
See application file for complete search history.

(56) References Cited

U.S. PATENT DOCUMENTS

| | | |
|---|---|---|
| 6,320,956 B1 | 11/2001 | Cherry |
| 6,493,695 B1 | 12/2002 | Pickering et al. |
| 7,366,778 B2 | 4/2008 | White |

(Continued)

OTHER PUBLICATIONS

U.S. Croke, et al. U.S. Appl. No. 13/162,881, filed Nov. 25, 2014, Office Action, dated Nov. 25, 2014, pp. 1-30.

(Continued)

*Primary Examiner* — Kyung H Shin
(74) *Attorney, Agent, or Firm* — Michelle Whittington

(57) ABSTRACT

This disclosure relates to handling email for a contact center. In one example, a contact center system can include an email interface to access an enterprise email system, inbound emails to and from each inbound mailbox in the contact center system being stored and maintained in the enterprise email system. An email tracking data structure can be stored in memory, the email tracking data structure programmed to store interaction data corresponding to each email interaction being processed by the contact center system. An email handling control can be programmed to control sending a reply email to a given incoming contact email from a contact based on the interaction data associated with the given incoming contact email, the reply email being sent to the contact through the enterprise email system via the email interface.

14 Claims, 9 Drawing Sheets

(56) References Cited

U.S. PATENT DOCUMENTS

| | | | | |
|---|---|---|---|---|
| 7,428,303 B2* | 9/2008 | Campbell | ........... | H04M 3/5125 370/352 |
| 7,568,001 B2* | 7/2009 | McPartlan | .......... | H04M 3/5235 709/202 |
| 7,818,385 B2 | 10/2010 | Naick | | |
| 2004/0054743 A1* | 3/2004 | McPartlan | .......... | H04M 3/5235 709/206 |
| 2005/0102355 A1 | 5/2005 | White | | |
| 2006/0165066 A1* | 7/2006 | Campbell | ........... | H04M 3/5125 370/352 |
| 2006/0259556 A1* | 11/2006 | Auhagen | .............. | G06Q 10/107 709/206 |
| 2011/0302255 A1* | 12/2011 | Miller | ................. | H04M 3/4936 709/206 |

OTHER PUBLICATIONS

U.S. Croke, et al. U.S. Appl. No. 13/162,881, filed Nov. 25, 2014, Office Action, dated Jul. 2, 2014, pp. 1-29.
U.S. Croke, et al. U.S. Appl. No. 13/162,881, filed Nov. 25, 2014, Office Action, dated Aug. 8, 2013, pp. 1-25.
U.S. Croke, et al. U.S. Appl. No. 13/162,881, filed Nov. 25, 2014, Office Action, dated Feb. 27, 2013, pp. 1-20.

* cited by examiner

EMAIL HANDLING FOR A CONTACT CENTER

CROSS-REFERENCE TO RELATED APPLICATION

This application is a continuation of U.S. patent application Ser. No. 13/162,881, filed Jun. 17, 2011, and entitled EMAIL HANDLING FOR A CONTACT CENTER, the entire contents of which is incorporated herein by reference.

TECHNICAL FIELD

The present disclosure relates to handling email for a contact center.

BACKGROUND

Call centers and contact centers are utilized by many companies for the purpose of receiving and transmitting a large volume of requests by telephone or other forms of communication, such as email, online chat, website information exchange, fax, and instant messaging. In addition to servicing incoming requests to the company, the call center or contact center can also be utilized for outgoing communication, such as for telemarketing, contacting clients, and debt collection. Contact centers tend to fall short in relation to how emails are handled.

SUMMARY

The present disclosure relates to handling email for a contact center.

In one example embodiment, a contact center system can include an email interface to access an enterprise email system, inbound emails to and from each inbound mailbox in the contact center system being stored and maintained in the enterprise email system. An email tracking data structure can be stored in memory, the email tracking data structure programmed to store interaction data corresponding to each email interaction being processed by the contact center system. An email handling control can be programmed to control sending a reply email to a given incoming contact email from a contact based on the interaction data associated with the given incoming contact email, the reply email being sent to the contact through the enterprise email system via the email interface.

In another embodiment, a method of handing email for a contact center can be implemented. The method can include receiving a given contact email from an incoming contact center mailbox of an enterprise email system. The enterprise email system can maintain and store the given contact email outside of the contact center. Email tracking data describing an email interaction for the given contact email that is being processed by the contact center can be stored in memory. The given contact email can be delivered to a selected agent email client and a reply email associated with the email interaction for the given contact email can be received. The method controls sending the reply email to a contact that sent the given contact email based on the email tracking data of the email interaction for the given contact email, the reply email being sent to the contact through the enterprise email system.

DETAILED DESCRIPTION

This disclosure relates to handling emails for a contact center. The email handling is enabled by providing an email interface that allows an enterprise email system to be utilized. As a result, multiple disparate email systems can be utilized with the contact center system. Additionally, this arrangement enables the email system to store and maintain inbound and outbound emails for the contact center. The email interface also allows various types of email clients to be utilized by agents, which can include the enterprise email system or an email server that is external to the contact center and the enterprise email system. Email handling controls can also operate to prevent duplicate replies from being sent to contacts. Still further, email handling controls can be utilized for prioritizing incoming email messages rather than relying on traditional serialization or first-in-first-out mechanisms.

In one example, multiple contact center systems can cooperate to provide for redundancy in the event that one or more contact center systems (e.g., a primary contact center system) cannot operate according to expected parameters. In such a scenario, a secondary contact center system may become active for processing and handling incoming email as well as other forms of communication. The contact center systems can synchronize with each other through messaging, such as by email messages sent to each other through a network (e.g., via the enterprise email system). If multiple contact center systems are operating concurrently although without direct communication between such systems, each contact center can implement a defined process for claiming and processing emails.

Figure 1:
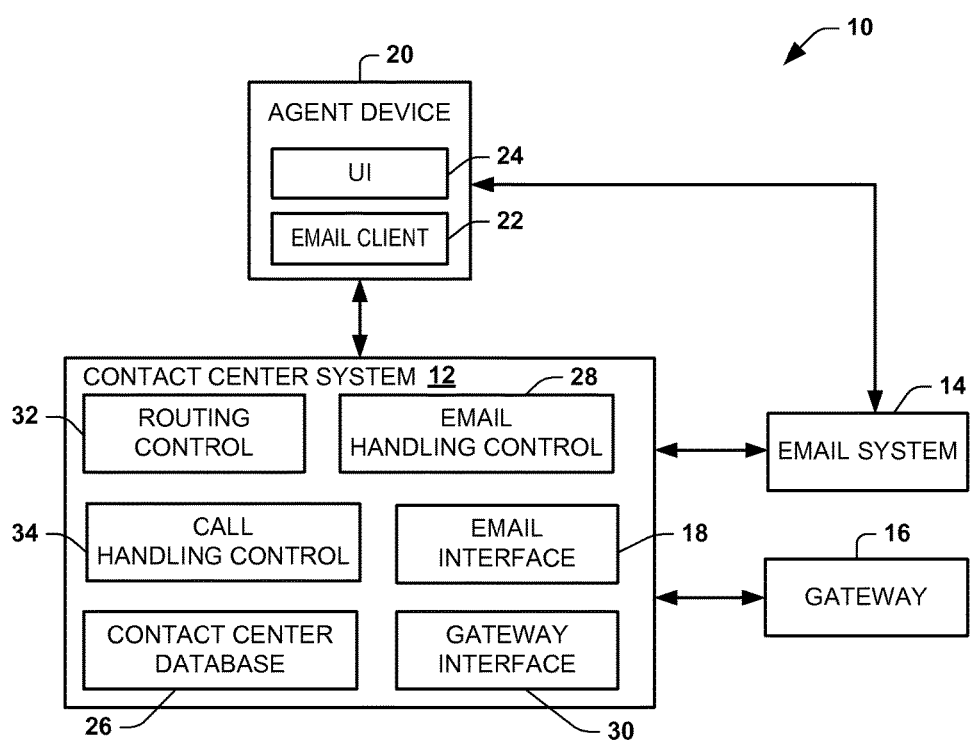
FIG. 1 depicts an example of an architecture for implementing a contact center.

FIG. 1 depicts an example of a system 10 that can implement a contact center system 12. The contact center system 12 can be configured for handling communications via any number of one or more forms of communication media, such as including telephone calls, email, instant messaging, text messages, audio visual communication and the like. For purposes of simplicity of explanation, the contact center system 12 in the example of FIG. 1 can handle email communication from an email system 14 as well as audio or audio-visual communication via a gateway 16. The email system 14 and gateway 16 can be external to the contact center system 12, as depicted in FIG. 1.

By way of example, the email system 14 can correspond to an enterprise email system that includes one or more email server (e.g., a corporate email server). Such email servers will include email accounts to which contacts can send emails into the contact center system 12. Example of such email accounts can include sales@xyzcorp.com, support@xyzcorp.com or other accounts that can be named by the administrator of the contact center system 12. Each of these email addresses thus corresponds to an email account and associated mailbox residing on the email system 14. The contact center system 12 includes an email interface 18 that is operative to receive and send emails via the email system 14. The email interface 18 can utilize an internet message retrieval protocol for receiving emails from the email system 14. In one example, the email interface employs the internet message access protocol (IMAP) or other known or yet-to-be developed protocol that allows the emails to remain on the server of the email system 14. For instance, IMAP can be implemented using encryption, such as IMAP over Transport Layer Security (TLS). Since the email accounts are maintained and reside within the email system 14, existing enterprise backup strategies can be more effective in backing up and maintaining contact center emails. This is in contrast to existing contact center systems that delete emails from email servers when downloaded to local storage in the contact center.

The email interface 18 also allows the system to connect to any number and type of email clients that are utilized by agents of the contact center system 12. Each such agent can employ an agent device 20 to communicate with the contact center system 12. The agent device 20 includes an email client 22 via which a given agent can send and receive emails. The email client can be implemented as any mail user agent programmed to manage a user's email, such as small or fat client email applications or web-based email applications. The email interface 18 in the contact center system 12 thus affords enhanced flexibility by allowing an agent the ability to utilize different email clients in contrast to a client existing within the contact center's system. The email client 22 can thus communicate emails via the email system 14 as well through one or more other email servers.

The contact center system 12 is configured with agent email client information (e.g., email addresses and other account information (if needed)) that can be stored in a contact center database 26. The email interface 18 thus can use such agent email client information to send selected emails to each agent. For example, the email interface can employ the simple mail transfer protocol (SMTP) or other email transfer protocol for delivering such email the agent email client 22. To provide for added security, the email interface 18 can employ SMTP over TLS.

Each agent device also includes a user interface 24 that can be utilized for manipulating the email that is received by and sent from the agent. The user interface can also be utilized to access and control other agent tools that may be implemented within the contact center system 12. For example, such tools can be utilized to transfer calls and/or emails to other agents, arrange an agent queue of interactions or otherwise interact with other related methods implemented by contact center system 12.

The contact center system 12 also includes an email handling control 28 that is programmed to control assignment and distribution of emails to agents. The email handling control 28 is also programmed to control sending agent reply emails to contacts. Much of the email handling is based upon email tracking data stored in the contact center database 26. The email tracking data can include various parameters or attributes associated with each email that is being processed by the contact center system 12. Email tracking data for each email includes an interaction global unique identifier (GUID) that allows the system to track and handle each email as belonging to a common interaction. As used herein, an interaction refers to a communication between the contact center and a contact, which may originate external or internal to the contact center, such as can include a telephone call, an email interaction, an instant messaging session, an online chat session as well as other forms of multi-media communication that exist or have yet to be developed. A plurality of such interactions in one or more forms of communication can be linked together to form a thread. For example, a given email interaction can include an incoming email from a contact, an email delivered to an agent, a reply from an agent and a reply email to the contact. The group of email communications as well as other related emails can each be linked by the contact center system 12 to form a corresponding thread of emails about a common subject. Each email in the interaction can include email tracking data, which includes an interaction GUID tying each email to a common interaction. The type and extent of such emails can vary for a given interaction according to its stage of handling. The email tracking data can also store a variety of other information to enable the email handling control to process incoming and outgoing emails. An example of such email tracking data for a given email is disclosed herein with respect to FIG. 3.

The contact center system also includes a routing control 32 that is configured to determine and assign agent to each incoming contact email. The routing control 32 can employ routing rules, such as skills based routing rules, to determine an available agent to whom each email is sent. The assignment information can be stored for each respective email as part of the email tracking data in the contact center database.

By way of example, the email handling control 28 can submit incoming contact emails to the routing control 32 for routing to a selected agent. The order in which the email handling control 28 submits emails to the routing control 32 can be based on, for example, a combination of priority determined by the handling control 28 and time of arrival for each email. When an agent answers a contact email via agent user interface, the email interface 18 retrieves the contact email from the account INBOX, the header fields are re-written, and the email is transferred to the agent. For example, the contact email is sent to the agent's inbox by SMTP to appear in the agent's email client, such that it can be downloaded by the email client 22 (e.g., using a corresponding email protocol, such as POP3, IMAP or the like).

The email handling control 28 also is programmed to re-write email header fields before the email interface delivers a contact email to an agent. In this way, agent email replies are delivered to a predetermined outbound email account that is controlled by the contact center system 12. When an email reply arrives in the outbound account mailbox, email processing times can be calculated and email header fields can then be re-written once again before the response is transmitted to the contact. Once the transmission has succeeded or been copied to the pending-outbound mailbox, the original contact email will be deleted from the Incoming account INBOX, and the agent reply will be deleted from the outbound account INBOX.

In the event that an incoming contact email is answered by an agent, but a reply is not sent within a configurable amount of time (for each incoming email account), the email handling control 28 can re-assign and then re-route the email to an alternate agent. If the original agent replies to the email that has been re-assigned, (e.g., it is possible that an agent will be in the process of responding to an email at the time the email is re-queued for another agent), the email handling control 28 can discard the email reply from the currently-non-assigned agent with appropriate logging. Alternatively or additionally, the handling control 28 can employ the email interface 18 to remove the email from the original agent's inbox when it is re-assigned. The handling control 28 can also detect if an agent replies to an email that has been assigned to a different agent. If an erroneous reply is detected, the handling control 28 can send a notification to the assigned agent as well as to the agent who sent the reply. The handling control 28 can also store information about the event in a log stored in the contact center database 26.

In addition to handling emails, the contact center system 12 can also include a gateway interface for other forms of media communication received via the gateway 16. Such media communication can include telephone calls, audio-visual calls, instant messaging, text messaging or the like. In order to handle control of such incoming and outgoing communications received via the gateway 16, the contact center system 12 includes media handling control 34. The media handling control 34 thus can employ a variety of rules and other processes for facilitating handling and routing of various media communications to an agent to a group or to other destinations that might exist within the contact center system 12.

Additionally, the media handling control 34 can also cooperate with the email handling control 28 to link an email interaction with an incoming call via another form of media communication. For example, interaction data stored in the contact center database for an active interaction can include information identifying the contact (e.g., contact's name, email address, account number, and the like). This identifying information can be utilized by the email handling control 28 for an incoming contact email and by the media handling control 34 for an incoming call to ascertain whether an active interaction in another form of media exists. If an active interaction exists, the new incoming call or email can be routed to the same agent. For example, a customer may send an email request and then follow up later with a telephone call. The interaction data in the contact center database 26 thus allows the handling control to link different forms of media to provide superior customer service, such as by employing agent tools of the contact center system 12 to present both contact interactions concurrently via the user interface 24 at the agent device 20.

Figure 2:
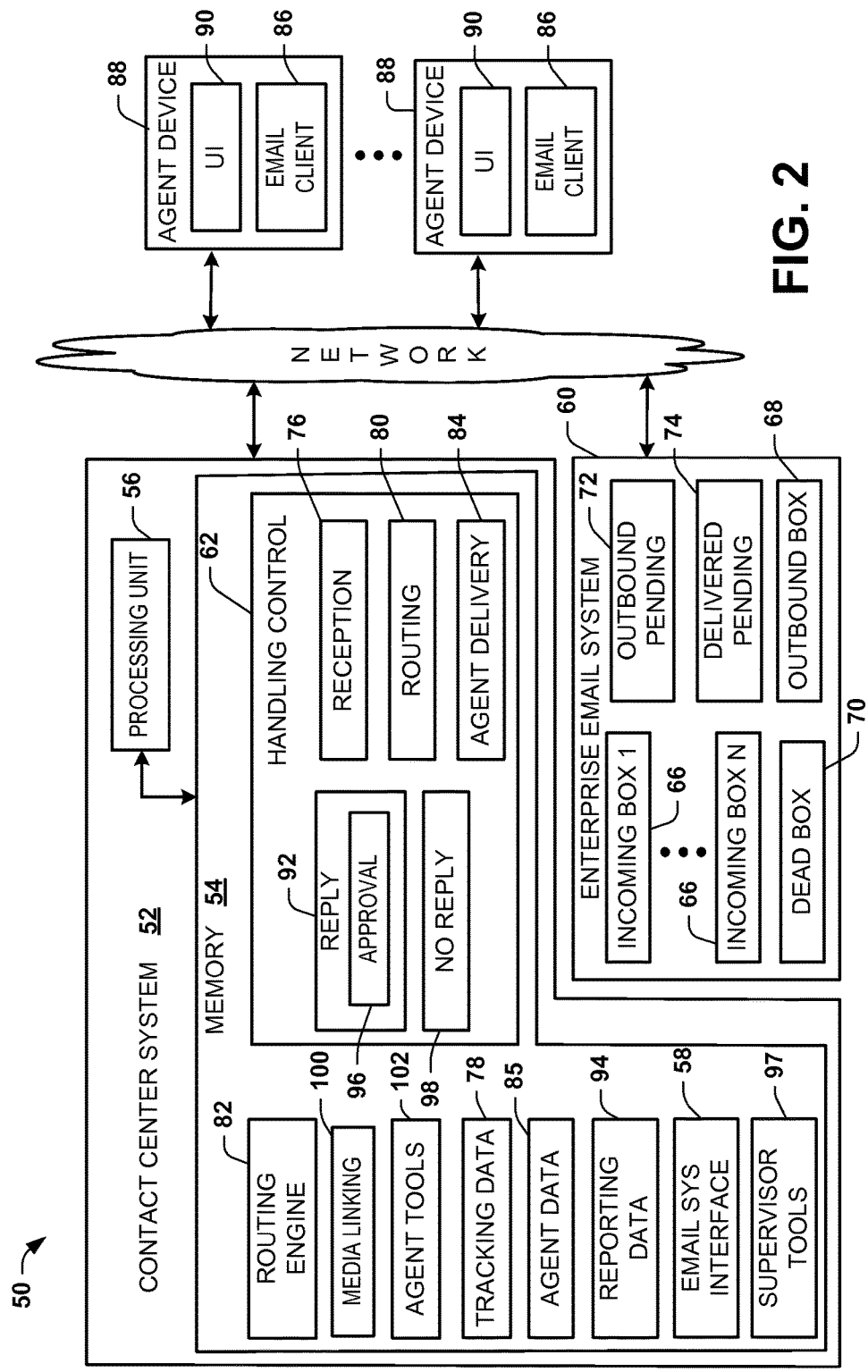
FIG. 2 depicts an example of a contact center system for handling email.

FIG. 2 depicts an example of an architecture 50 implementing a contact center system 52. In the example of FIG. 2, the contact center system 52 can be implemented in one or more computers (e.g., a server or group of servers) that include memory 54 and a processing unit 56. The memory 54 can include an arrangement of system memory and additional memory devices, such as including a hard disc drive, removable storage media, read-only memory (ROM) and random access memory (RAM). The processing unit 56 is coupled to the memory 54 for accessing data and executing instructions stored therein.

In the example of FIG. 2, inbound emails to and from each contact center mailbox are maintained and stored in an enterprise email system 60. This is accomplished by employing an email interface 58 that implements a message access protocol (e.g., IMAP) that leave messages on the email server until explicitly deleted. In this way, email data for the various contact center email mailboxes (inboxes and outboxes) are maintained and controlled within the context of the enterprise email system 60. As disclosed herein, enterprise data backup strategies thus can be utilized to ensure appropriate redundancy and backup of the contact center emails. This is in contrast to prior approaches in which emails were pulled directly from the enterprise email system and stored explicitly in memory within the contact center system. Stated differently, the contact center system 52 can utilize the mail server from the enterprise email system 60 as the mail source in contrast to local caching within the contact center system. The contact center system 52 can communicate with the email system 60 over a network 61, such a can include a local area network, a wide area network or a combination of networks. The network 61 can be implemented as including physical connections (e.g., optical fiber, electrical connections), wireless connections, or a combination of physical and wireless communication technologies.

As described above, the email system interface 58 can utilize IMAP for transferring email messages from the enterprise email system 60 into the contact center system such as according to protocol specifications set forth in RFC 3501 (e.g., IMAP4) or other versions of IMAP. The contact center system effectively operates as a client for the contact center email accounts provided on the enterprise email system 60.

The memory 54 also includes handling control 62 programmed for controlling how email messages are transferred into and out of the contact center system 52. To facilitate the transfer of email messages with respect to the contact center system 52, the contact center system employs email boxes implemented within the context of the enterprise email system 60. In the example of FIG. 2, the email boxes include a number of one or more incoming boxes 66 indicated at incoming box 1 through incoming box N, where N is a positive integer denoting the number of incoming mailboxes for the contact center. The contact center system 52 can utilize any number of incoming mailboxes as may be defined by the user (e.g., by an administrator), such as may vary depending upon the purpose and needs of the contact center system. The enterprise email system can also include an outbound mailbox 68 for the contact center. The outbound box 68 can be utilized for receiving messages, namely, reply messages or other outbound messages sent from agents. In addition to inbound and outbound mailboxes 66 and 68, the enterprise email system can also be configured to store undeliverable emails to agents such as in a dead box 70. For example, the dead box 70 can be utilized to store reply messages from an agent who is not presently authorized to reply to a given email.

Within the contact center system, the memory 54 can include an outbound pending box 72. The outbound pending box 72 can be utilized to store replies from agents that have been processed, but need to be stored for later re-transmission. In addition to the outbound pending box 72, the contact center system 52 can include a delivered-pending box. The delivered pending box 74 can be utilized to hold emails that have been answered but have not yet been delivered to an agent. For example, the handling control 62 can place a contact email into the delivered pending box 74 in response to an SMTP failure in which such message is unable to be delivered to the corresponding agent to which it has been assigned.

The contact center system 52 can store tracking data 78 in a contact center database (e.g., contact center database 26 of FIG. 1). The tracking data 78 can include database entries that represent attributes and properties for each email that is being processed by the contact center system 52. The handling control 62 thus employs its functions and methods to modify and create entries in the tracking data 78, such as disclosed herein with respect to FIG. 3.

The handling control 62 can include several functions or methods utilized to control transfer and distribution of email into or out of the contact center system 52. The handling control 62 can include a reception method 76 that operates on each email that arrives in one of the incoming boxes 66. The reception method 76 can create or update tracking data for each incoming email. The reception method 76 can also generate an automatic response to a given email coming into one or more of the incoming boxes 66. This can be a user programmable feature to provide such automated responses to provide an assurance to a contact that the contact's email has been received by the contact center system 52.

The reception method 76 can also prioritize emails by calculating a priority according to a prioritization algorithm applied to the information contained within the incoming contact email. For example, the reception method 76 can employ a look-up to a customer database to ascertain a discrete customer level (e.g., an importance) based upon the header information that has been retrieved from the incoming contact email. The priority can be stored as part of the tracking data 78 for each email. In some cases, such as for new customers or the like, no prioritization may be written to a given email tracking record. Additionally, the reception method 76 can log an arrival time for the email message in the tracking data 78. The arrival time, for example, can correspond to the arrival time that such email was received by the enterprise email system 60.

The handling control 62 can also include a routing method 80 to control routing of a given contact email that is received by the enterprise email system for each of the contact center's incoming boxes 66. The routing method 80 can employ a routing engine 82 that can be programmed to employ rules and policies for routing an email message (as well as other types of communication interactions) within the contact center system 52. For example, the routing engine 82 can employ skills based routing based upon a set of available agents to determine an appropriate available agent and in turn assign the inbound email to such agent. The assignment information (e.g., agent identification data) can be stored in the tracking data 78 for each respective email. In addition to identifying a given agent as a route point for an email, the routing engine 82 can identify a group of agents that may be classified according to skills or other criteria in which agents may be grouped within the contact center system. At some level, however, the routing engine identifies a selected agent to which the email is routed and such agent identity is stored as routed-to information within the tracking data 78. If the email has received a prioritization via the reception method 76, such routing can be performed according to the prioritization that has been established.

The handling control 62 can also include an agent delivery method 84 that is utilized to control the transfer and delivery of the email message from the incoming box 66 to the routed-to agent based upon the reply to data that has been stored in the tracking data 78. The memory 54 can also store agent data 85 that includes agent profile information as well as agent contact information (e.g., email address as well as passwords, if implemented). In this way, the agent delivery method 84 can employ the agent data for the selected agent for transferring the contact email to the email client that is associated with the selected agent.

The email client 86 can run in an agent device 88 that can include a user interface 90 that can be utilized to access or otherwise cause the email client 86 to answer the incoming contact email. In response to the email client 86 answering the contact email, the agent delivery method 84 can employ the email interface 58 to retrieve the email message from the appropriate incoming mailbox, modify appropriate header fields and send (e.g., via SMTP) the message to the agent's inbox for the routed-to agent to which the incoming email has been assigned. When the email has been sent to the email client 86 for the routed-to agent, the agent delivery method 84 can update the status of the email interaction within the tracking data 78. When the agent delivery method 84 sends an email to the routed-to agent associated agent, the agent delivery can also update the tracking data to reflect that the email has been answered, such as being added to an answered email list.

In order to facilitate tracking each email that is being processed by the contact center system 52, each email within the contact center system can include an interaction GUID. The interaction GUID can be the same for multiple email messages within the system, such as for email messages corresponding to different stages or phases of the contact email process (e.g., an incoming email message, the email sent to the agent, a reply from the agent and an outbound email message, a pending email message or the like). Each email instance within the contact center system can also employ a unique email GUID to uniquely identify each email that passes through the system 52.

The handling control 62 can also employ an email reply method 92 to control handling replies received from each agent. The reply method 92 can be programmed to ensure that a single reply is sent in response to each incoming contact email. For example, the reply method 92 can ascertain whether a given email exists as part of an active email interaction within the system based upon information stored as part of the tracking data 78 (e.g., an interaction GUID). If the interaction GUID of the reply email does not match a GUID stored in the tracking data 78, the system can infer that the interaction has already been terminated for this email, such that the reply should not be sent to the originating contact. Instead, the reply method 92 can send the reply to the dead box 70, and an appropriate notification be sent back to the agent that sent the reply. The erroneous reply email can also be deleted from the contact center database. If the reply method 92 determines that the reply is part of a valid email interaction and a reply has not yet been sent, the reply method 92 can retrieve the email from the email client 86 via the email system interface 58 (e.g., using IMAP fetch instruction) and rewrite the header fields so that the reply email can be sent to the originating contact yet appear that it is sent from the mailbox to which the contact had originally sent the inbound email. The reply method 92 can also update tracking data 78 to reflect that a reply had been sent to the contact and to the routing engine such as for storing reporting data 94. If the attempt to send the reply to the contact fails (e.g., due to the connection to local SMTP being down), the reply method 92 can write the reply to the outbound pending mailbox 72 for later retransmission as well as can log an error to reporting data 94.

The reply method 92 can also be programmed with an approval function 96 that can be utilized to perform an intermediate approval process for a reply email from an agent before rewriting header fields and sending the reply email to the contact. The approval method can be established as an attribute of the interaction data that is created for each email. The approval can be set, for example, depending on the level of priority assigned to an email message by the reception method 76. For example, a VIP or other preferred customer may have a higher level of prioritization so that the incoming email is routed more quickly due to a higher priority than a normal serialization of the email. The higher priority email can likewise require approval of a reply before sending out to ensure that the customer-contact receives a greater level of scrutiny on all communications. Additionally or alternatively, the approval can be implemented depending on attributes of the routed-to agent. For example, a new or probationary agent may require a greater level of scrutiny and oversight than a more senior agent.

As an example, the approval function 96 can send the agent's reply (or a copy thereof) for approval by a supervisor or other predetermined agent having sufficient authority. Where such an approval is being implemented, the approval agent (e.g., a supervisor) may be afforded an opportunity to approve or reject the reply email. The approval for a given reply email can be entered via GUI element provided by supervisor tools 97. If the email is rejected, the approval function 96 can send a notification back to the replying agent, such as with instructions to revise the reply or to notify the agent that the incoming email is being re-routed to a new agent. Alternatively, the supervisor or other authorized agent can retrieve the email and edit it, if desired, via their email client. If the supervisor or other authorized user modifies the email, the reply method 92 can rewrite header fields and send the rewritten reply to the originating contact as described above. In either case, an appropriate notification can be sent back to the agent and reporting of the event can be stored in reporting data 94. If the reply email is modified by the supervisor, a copy of the actual reply that is sent to the customer can be stored in the interaction database and sent to the original agent so that such agent can have access to a copy of the email should additional emails occur as part of this interaction. Once an email reply has been sent in response to an incoming email, the reply method 92 can delete the incoming contact email from an incoming box 66 as well as delete the email from the outbound mailbox 68. Corresponding tracking data 78 for the email can be updated and the email can be deleted from the answered list.

The handling control 62 can also include a no-reply method 98 that is programmed to determine if a given incoming email is not replied to within a predetermined time period (a no-reply time) after being answered by an agent. It is to be appreciated that different no-reply times can be established for different incoming emails. For example, different reply times can be set, such as based upon the priority of the email, the incoming box to which the contact email is sent or other criteria that can be determined by the reception method 76. If the no-reply method 98 determines that a given incoming contact email is not replied to within the no-reply time, the no-reply method can log the no-reply event as part of the reporting data 94 and resubmit the email for routing by the routing method 80 and routing engine 82 for transferring the inbound contact email to a different agent. If the email is transferred to a different agent, the no-reply method 98 may employ the email interface 58 to delete the email from the inbox of the email client 86 for the previously selected agent. Alternatively, if the email remains in the inbox of the first agent after being transferred to a new agent, the reply method 92 can operate (based on the updated tracking data 78) to ensure that the new authorized agent, to which the inbound email has been transferred sends the reply, such as disclosed herein.

The contact center system 52 and the handling control 62 can be configured to handle various other forms of media communication in addition to email. The contact center system 52 can also include a media linking component 100 that is programmed to automatically link two different forms of communication for a given contact. For example, if a contact calls into a contact center and is identified (e.g., via DNIS or an account number via an automated or manual intake process), the media linking component 100 can query the contact center database for email data relating to such customer, such as can be stored as part of tracking data.

As an example, agent tools 102 implemented on a corresponding agent device 88 can employ the media linking component 100 to provide the agent with interaction information linking to multiple forms of communication media for a given contact. For instance, while an agent may be monitoring a telephone call that has been routed to the agent, the agent tools 102 can present additional interaction information for recent emails that may have been exchanged between the contact center system and the contact. The additional interaction information can be presented via the agent tools 102 automatically or in response to the agent invoking the media linking component, such as by activating a GUI element (e.g., a media linking button). Alternatively or additionally, in response to routing the incoming call to a given agent, the handling control 62 can employ the media linking component to send such agent a message or a link containing information about the previous email interactions for such customer.

As a further example, there may be cases where an agent would receive a contact email to which a reply would not be required. For example, a thank you email from a "happy" customer or a valid email for some other sender initiating an email to the contact sender by accident. For such circumstances, the agent can employ its user interface 90 to access corresponding agent tools 102 programmed to terminate the interaction, such as using a GUI element (e.g., a hang-up button) that includes an appropriate wrap-up code for deleting the interaction. Thus, the email handling control 62 can update the tracking data and remove the email from the contact center database in response to receiving such code.

Figure 3:
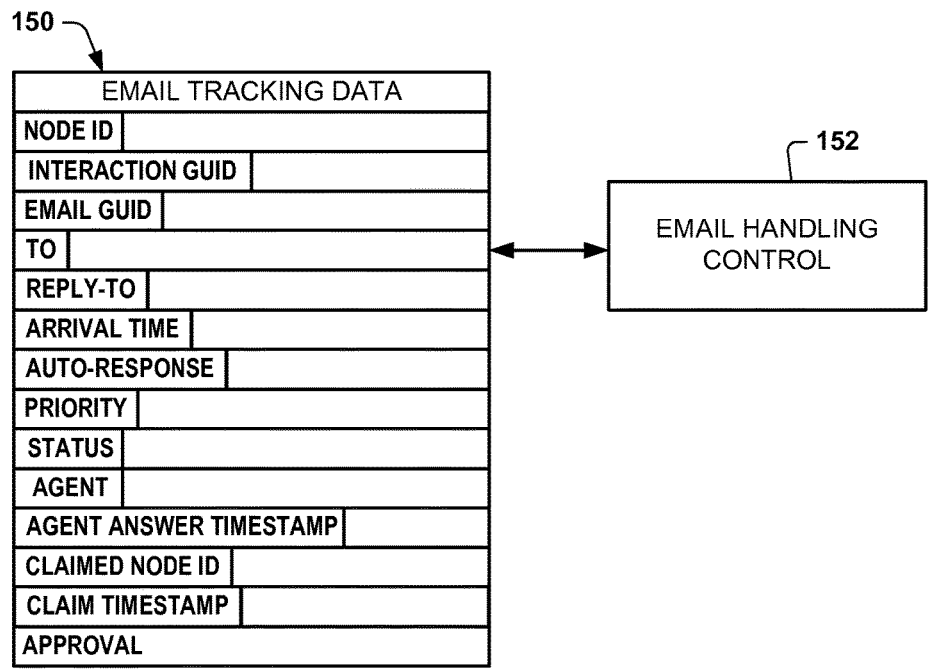
FIG. 3 depicts an example of an email tracking data structure.

FIG. 3 depicts an example of an email tracking data structure 150 that includes attributes and properties for each email. An instance of the emailing tracking data structure 150, for example, can be stored in a contact center database for each email that passes through the contact center system including inbound emails, replies, outbound emails and the like. In the example of FIG. 3, the creation and updating of the email tracking data structure 150 can be performed by email handling control 152 (e.g., corresponding to the handling control 62 of FIG. 2).

As an example, the tracking data structure 150 can be implemented as a table, list or other form of data structure stored in memory. In one example, these attributes can be stored within the contact center system. Alternatively, the attributes can be stored on the email server external to the contact center system. An instance (e.g., a record) of the tracking data structure 150 can be created for each email to track various attributes as they transition through the contact center system. For example, a reception function (e.g., reception method 76 of FIG. 2) of the handling control 152 can create a record for each email. The handling control 152 can also delete the record when the interaction has terminated (e.g., either by a reply email being sent to the contact or by the agent terminating the interaction). As one example, the key or index for the tracking data can be a composite of the interaction GUID and the Node ID.

The Node ID identifies which contact center system is processing the email. For example, multiple contact center servers can be implemented to provide for redundancy in operation. In such an example implementation, the node ID can be 1 for primary and 2 for secondary. As a further example, a secondary contact center server can create a new entry in this table even if a row with the same interaction GUID already exists. This helps to ensure that two-way database replication between the primary and secondary servers operates properly.

The email handling control 152 generates the interaction GUID to uniquely identify an email interaction. As mentioned herein, multiple emails within the contact center system can have the same interaction GUID, which identifies them as belonging to the same interaction although at different phases of such email interaction. As one example, an email interaction can include an incoming email from a contact to the contact center, an email from the contact center to an agent, an optional reply email from an agent back to contact center, and the corresponding optional reply email from the contact center to the original contact. An email GUID is a unique identifier for each email. The email GUID can correspond to the GUID contained in the email Message-ID header field, for example.

The tracking data also includes fields from the header of email messages, such as including the TO field and the REPLY-TO field. The TO field corresponds to the email address to which the email was originally sent to by the contact. The REPLY-TO field corresponds to the contents of the "Reply-to:" header field at the time the email was delivered to the incoming email account in the enterprise mail system.

An ARRIVAL TIME field can identify the GMT time when the email arrived at the email server. This may be different than the time that the email was first seen by the contact center system; however, the time at which the email arrived at the email server can be considered to be the time that the email entered the contact center system for reporting purposes.

An AUTO-RESPONSE SENT field is utilized to help ensure that a single auto-response email is sent to a contact. Thus, this field can be set when an auto-response has been sent for a given email. A PRIORITY field can be stored in the tracking data structure 150, such as to avoid having to recalculate priority for a large email backlog on re-start. STATUS field can be set to reflect a current status location of each email. For example, the STATUS field can be set as follows:

0=on email server;
1=routed; and
2=answered by agent.

The tracking data structure can also store information about the agent that is handling an email interaction. This can include an AGENT field to identify the agent that the handling control 152 assigns to the email interaction. For example, in the event that contact center were to re-start between the time that an email is delivered to an agent and the time that it is marked as answered in the database, on startup, the contact center can deliver the email to the agent to whom it was originally routed instead of being possibly routed to two different agents. An AGENT ANSWER TIMESTAMP field is set to identify the time at which the agent answered the email, such as for logging and reporting purposes. The no-reply method can also determine the appropriate time at which the email should be re-submitted to the routing engine for routing to an alternative agent if a reply has not been sent by the agent and the interaction has not been terminated (e.g., by the agent pressing the hang-up button on a GUI provided by the agent tools).

The tracking data structure 150 can also store an APPROVAL field that is set by the email handling control for each email to control whether supervisor approval is required for agent reply emails for a given interaction.

As disclosed herein, the contact center system can be implemented to provide for redundant operation, such as by having multiple servers each operating as a node configured to handle emails in an island mode, such as if normal operation cannot be sustained. To facilitate operation in the island mode, the tracking data structure 150 can include a CLAIMED NODE ID that identifies the node-id of the server that owns the current claim to the respective email. The claim process can be arbitrated by each server. A CLAIM TIMESTAMP can also be set in the tracking data structure 150 to represent when a claim is made to an email, which can vary depending on claim processing, such as disclosed herein with respect to FIG. 11. For example, if the claim is owned by the node writing the timestamp then the timestamp represents the local time at the time the claim email was transmitted. Alternatively, the timestamp can represent a universal time (e.g., GMT). If the claim is owned by some other node, then the timestamp can represent the email server arrival time of the claim email that established or re-asserted the claim.

Figure 4:
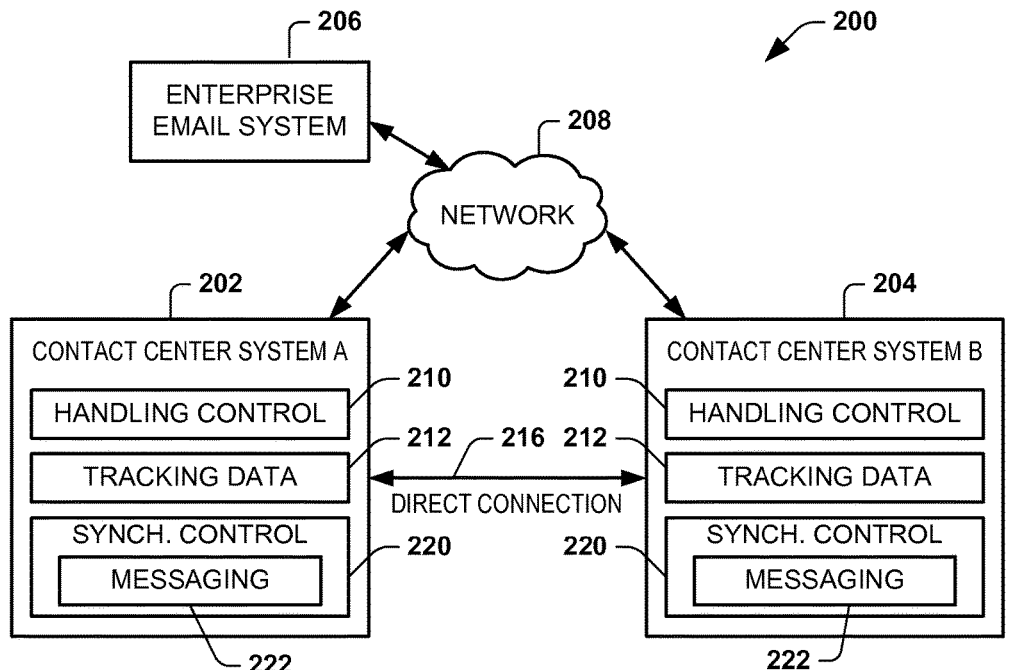
FIG. 4 depicts an example of implementation of primary and secondary contact center systems.

FIG. 4 depicts an example of a contact center system architecture 200 in which multiple contact center systems (e.g., servers) 202 and 204 can operate as distinct nodes to provide for redundant operation. Each of the contact center systems 202 and 204 can communicate with an enterprise email system 206 via a network 208. Each of the contact center systems 202 and 204 can be configured similarly to what is disclosed herein with respect to the examples of FIGS. 1 and 2. Briefly stated, each of the contact center systems 202 and 204 can include a handling control 210 (e.g., corresponding to handling control 62 of FIG. 2) to handle email and other communication media within the system 200. The handling control 210 can also create, update and delete corresponding tracking data 212 (see, e.g., FIG. 3) to facilitate handling and processing of emails and other media in the system 200. Communication with the enterprise email system can be via a corresponding email interface (not shown-but see email interface 58 of FIG. 2), which can employ IMAP support layer.

By way of example, one of the contact center systems 202 can operate as a primary contact center server and the other contact center system 204 can operate as a secondary server. During normal operation, each of the contact center systems 202 and 204 can communicate directly such as via a direct connection schematically indicated at 216. The direct connection 216, for example, can be through the network 208 over a secure communication channel (e.g., over TLS) or other forms of communication can be utilized to provide for such direct connection. Each contact center system 202 and 204 can maintain a contact center database that includes the tracking data 212. Thus, during normal operation, the secondary contact center server 204 can remain synchronized with the primary contact center server 202, such as including two-way replication of the contact center database, which includes tracking data 212 as well as other data that may be stored in the contact center database of the primary. During normal operation, the direct connection 216 can also provide for synchronization of a common time base for the system 200.

By way of further example, the respective contact center systems 202 and 204 may be implemented as servers located in a common location or, alternatively, may be located in remotely distributed locations (e.g., in different cities). In the event that the direct connection 216 is lost for a period of time, each contact center system 202 and 204 can no longer maintain synchronization via such connection. As a result, each contact center can operate in what can be referred to as an island mode, in which each server operates in an active mode to process emails sent to the contact center incoming email addresses at the enterprise email system.

When each of the contact center servers 202 and 204 are operating in island mode, each contact center system 202 and 204 can separately maintain its own contact center database, including separate tracking data 212. Additionally, during island mode operation, since both contact center systems 202 and 204 process emails from the same email server, synchronization between the two servers will be necessary to avoid duplicate processing of emails. In the example of FIG. 4, each contact center server 202 and 204 includes a synchronization control 220 to maintain synchronization through indirect mechanisms while operating in an island mode. As one example, each synchronization control 220 can employ a messaging function 222 that is independent and separate from the direct connection 216 to provide for synchronization in the system and to implement claim processing. The messaging functions 222 can perform such messaging through the enterprise email system 206. For example, each contact center server 202 and 204 can send and receive synchronization messages and claim messages as emails to one or more predefined synchronization mailboxes. Each of the contact center servers 202 and 204 can operate as email clients configured to access the synchronization mailboxes. The synchronization information can be embedded within the email body according to a predetermined synchronization format, such as XML (extensible mark-up language) or JSON (JavaScript Object Notation) formatted according to a predefined schema. Alternatively, the messaging function 222 can employ other messaging mechanisms, such as text messaging or a shared resource on the network 208, which can be utilized for sending and receiving synchronization information by the contact center servers 202 and 204. Additionally, during island mode operation, the synchronization via the messaging function 222 allows each of the contact center servers 202 and 204 to operate in a master mode for processing incoming contact emails.

By way of example, while each of the contact center servers 202 and 204 operates in the master mode, the synchronization control 220 can be programmed to employ a claim process at the time emails are to be submitted for routing via the handling control 210. The claim process can be performed for emails sent to each contact center incoming email box. The messaging function 222 can send and receive claim emails sent to a predetermined email address in the enterprise email system 206. The synchronization control 220 can also employ user-programmable timing events for controlling the claim process. For example, if a claim is not re-asserted by the claimant server within a predetermined time (e.g., about 60 minutes) then the claim is forfeited by the claimant server, and the claim process re-commences.

As a further example, the contact center server 202 or 204 that holds the claim to a given contact email can establish its claim start time, such as by including the local time within the claim email that it sends. This time is used when the claim email is received for establishing or re-asserting the claim. The synchronization control 220 for each of the contact center servers 202 and 204 can send a time synchronization message (e.g., an email) at predetermined interval (e.g., once every 60 minutes) to establish passage of time that can be agreed upon by both contact center servers. The server that doesn't hold a claim will compare the email server arrival timestamp of the most recent claim email with the arrival timestamp of each claim and time-sync email that it receives. If the timestamp of the arriving email is more than a predetermined time period (e.g., about 60 minutes) later than the arrival timestamp on the claim then the claim is marked as expired.

Once normal operation can resume, including synchronization via the direct connection 210, the synchronization control 220 in each of the contact centers can operate to merge the respective email tracking data structures back into the primary for resuming normal operation. The merging of tracking data structures from the respective contact center systems 202 and 204 is facilitated by use of the node ID attribute that is part of the email tracking data structure 212 that is set for each email message as part of the contact center database. For example, all emails passing through the contact center system 202 can be assigned a node ID of 1 as part of its the email tracking data, whereas all email messages within the other contact center system 204 can be provided a different node ID (e.g., node 2).

Additionally, when a secondary contact center system 204 operating in master mode reverts back to its slave mode, it will no longer re-assert its claims, causing them to eventually fail back for processing by the primary contact center server 202. If an active contact center system 202 or 204 determines that it has lost a claim to an email which is currently being handled by an agent, the handling control 210 thereof can terminate the interaction and notify the agent of the corresponding event.

In view of the foregoing structural and functional features described above, example methods will be better appreciated with reference to FIGS. 5-11. While, for purposes of simplicity of explanation, the example methods of FIGS. 5-11 is shown and described as executing serially, it is to be understood and appreciated that the present examples are not limited by the illustrated order, as some actions could in other examples occur in different orders and/or concurrently from that shown and described herein. The method can be implemented as computer readable instructions, such as can be stored in a non-transitory computer readable medium, such as a memory device. The instructions in the medium may be executed by a processing unit such as disclosed herein.

Figure 5:
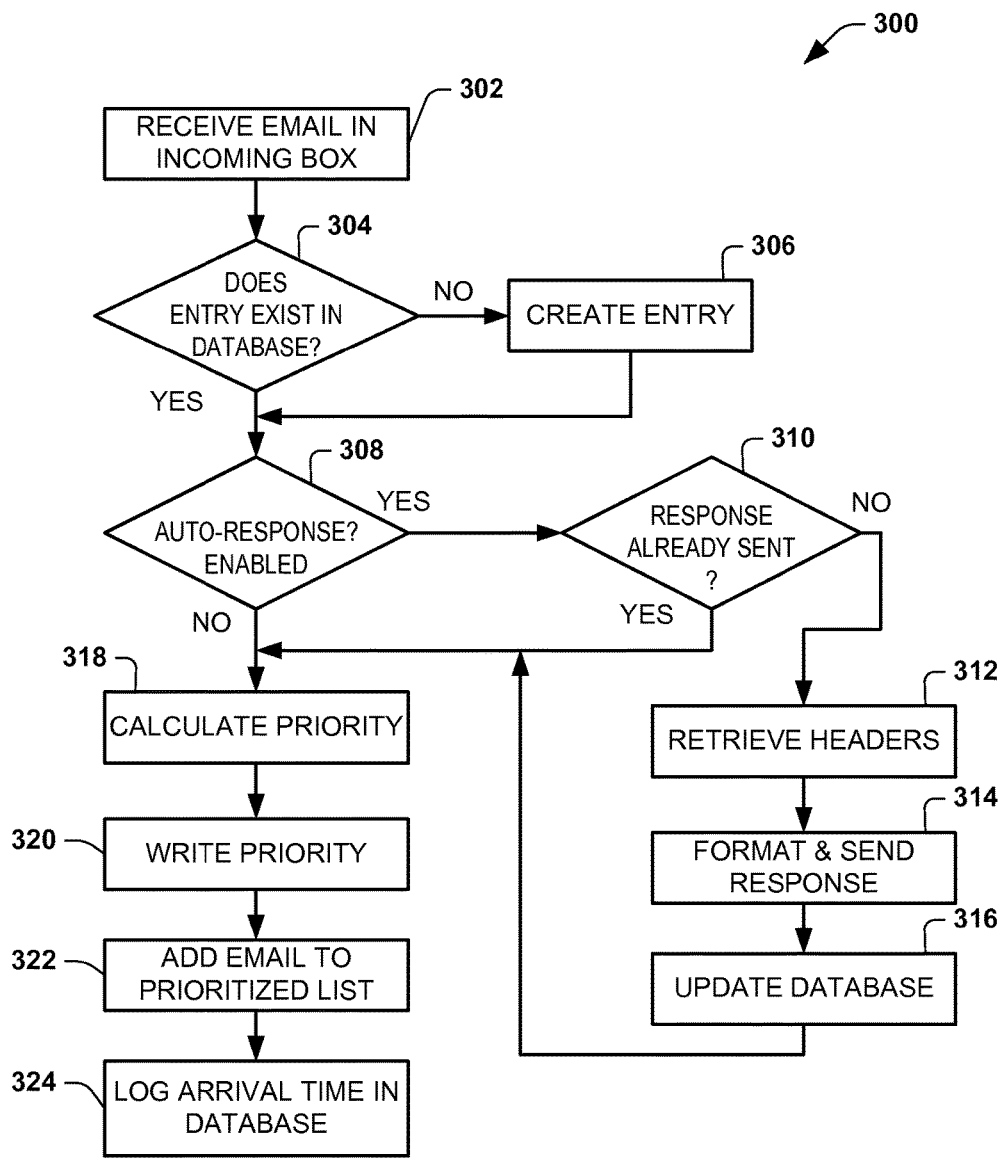
FIG. 5 is a flow diagram depicting an example method for receiving an email from a contact.

FIG. 5 illustrates an example of a method 300 that can be implemented for receiving an inbound contact email (e.g., by the reception method 76 of FIG. 2). At 302, a message is received at an incoming mailbox, such as residing in an enterprise email server for a contact center system. At 304, a determination is made whether an entry already exists in the contact center database for the email. If no entry exists (NO), corresponding to a new inbound contact email, the method proceeds to 306 to create an entry for the respective email. The entry can include the fields disclosed herein (e.g., see FIG. 3). From 306, and if it is determined at 304 that an entry already exists for the received contact email, the method proceeds to 308.

At 308, a determination is made whether auto-response is enabled. This determination can be based on the incoming mailbox to which the contact email was sent. For example, a contact center can configure auto-response to be enabled or not enabled for different incoming mailboxes or auto-response can be applied globally to all mailboxes. If auto-response is enabled, at 310, a determination is made whether a response has already been sent, such as based on information stored in the contact center database (e.g., tracking data) for the respective email. This can be done so that multiple responses are not sent out to the contact. If no response has been sent, the method can proceed to 312 and retrieve header information for use in constructing the auto-response to be sent back to the originating contact and to appear as sent from the mailbox to which the incoming email was sent. At 314, the auto-response can be created with predetermined text from the database, and the response can be appropriately formatted and sent, such as via an email interface (e.g., via SMTP). At 316, the tracking information in the contact center database can be updated to reflect that the auto-response has been sent. As explained above, the auto-response will have the same interaction GUID as the other emails corresponding to this email interaction. From 316, and if it is determined at 310 that a response has already been sent, the method proceeds to 318.

At 318, a priority for the email is calculated. The priority can be computed based on information contained in the email, which identifies the contact or a defined characteristic of the contact. For instance, a reply email address (from which the email was sent) and or account information can be used to conduct a query for an existing customer in the contact center database to ascertain a priority level, if any. Alternatively or additionally, a type of request, such as can be described in the email, and/or the incoming email box can be utilized to determine a priority for the email. At 320, the determined priority can be written to the database as part of the tracking data for the email received at 302. At 322, the email can be added to a prioritized list to facilitate its routing within the contact center system. At 324, the arrival time of the email can be added to the tracking data in the contact center database. The arrival time can correspond to the arrival timestamp when the email is received at the enterprise email server, which is considered to be the time it enters the contact center system.

Figure 6:
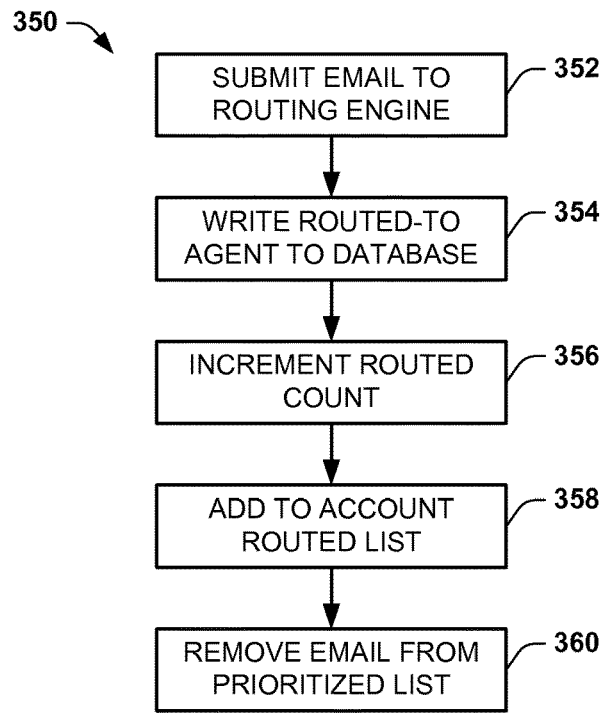
FIG. 6 is a flow diagram depicting an example for routing a contact email.

FIG. 6 depicts an example of a method 350 that can be implemented in a contact center system for routing an email, such as an inbound email to a contact center email inbox. Each email inbox includes an email account and the routing method 350 can be utilized for routing each email in the inbox based on a prioritization (e.g., as determined in the method 300 of FIG. 5). At 352, the method includes submitting the email, according to its priority, to a routing engine (e.g., routing engine 82 of FIG. 2), which is programmed to select an available agent (a "routed-to agent") to whom the email is to be routed. For instance, the routing engine can implement a skills based routing algorithm as configured by the contact center. At 354, the routed-to agent is written to the contact center database, such as in a routed-to entry of the email tracking data structure. At 356, a routed count is incremented for monitoring the number of emails routed to each agent. At 358, the email is added to an account routed list such as for tracking the accounts to which emails have been routed. Then at 360 the email, having been routed, is removed from the prioritized list and the email is ready for delivery to the agent.

Figure 7:
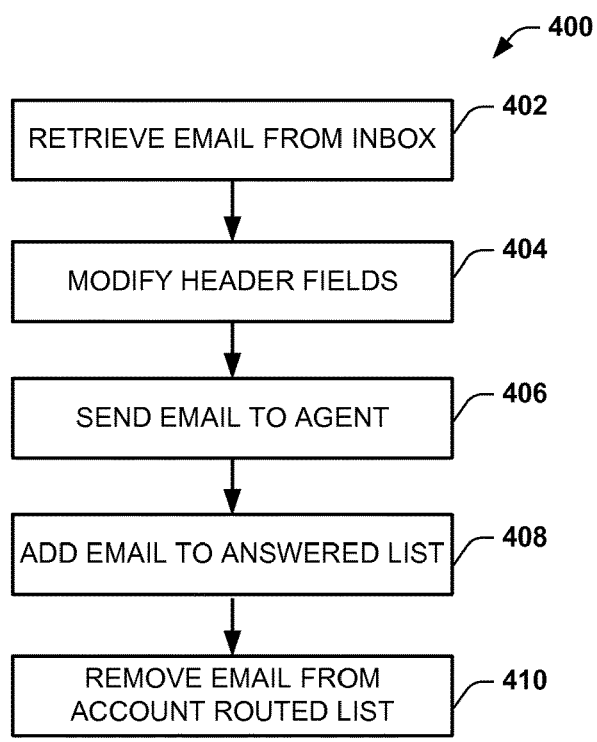
FIG. 7 is a flow diagram depicting an example method for delivering an email to an agent.

FIG. 7 depicts an example of a method 400 that can be implemented (e.g., by the agent delivery method 84 of FIG. 2) in a contact center for delivering an email to a selected routed-to agent. At 402, in response to an email being answered by an agent (e.g., by an email client for such agent), the email is retrieved from the inbox, such as by using IMAP. For example, the handling control of the contact center system can retrieve the email by reading it from the corresponding inbox in the enterprise email system to which it was sent by the contact. At 404, header fields of the email read from the inbox are modified for distribution to the designated agent. For instance, the "to:" header field is changed to the agent's email address based on agent email data that is stored in the contact center database. Additionally, the "reply-to" header field can be changed to the email address for the contact center outbound box, as described above. In this way, the agent's reply can be routed to the pre-established outbound box for the contact center in a known manner. Additional metadata can be added to the header, including keywords to identify the email as a contact center email and an interaction GUID can be set so that the contact center handling control can determine how to handle replies or other email threads pertaining to the email being routed.

At 406, the email with modified header fields is sent to the agent, such as via SMTP (by the email interface). At 408, the email is added to the answered list, such as by updating the tracking information in the contact center database. At 410, the email can also be removed from the account-routed list since it has now been answered by an agent. The contact center can then process a reply email, if any from the agent according to contact center handling rules.

Figure 8:
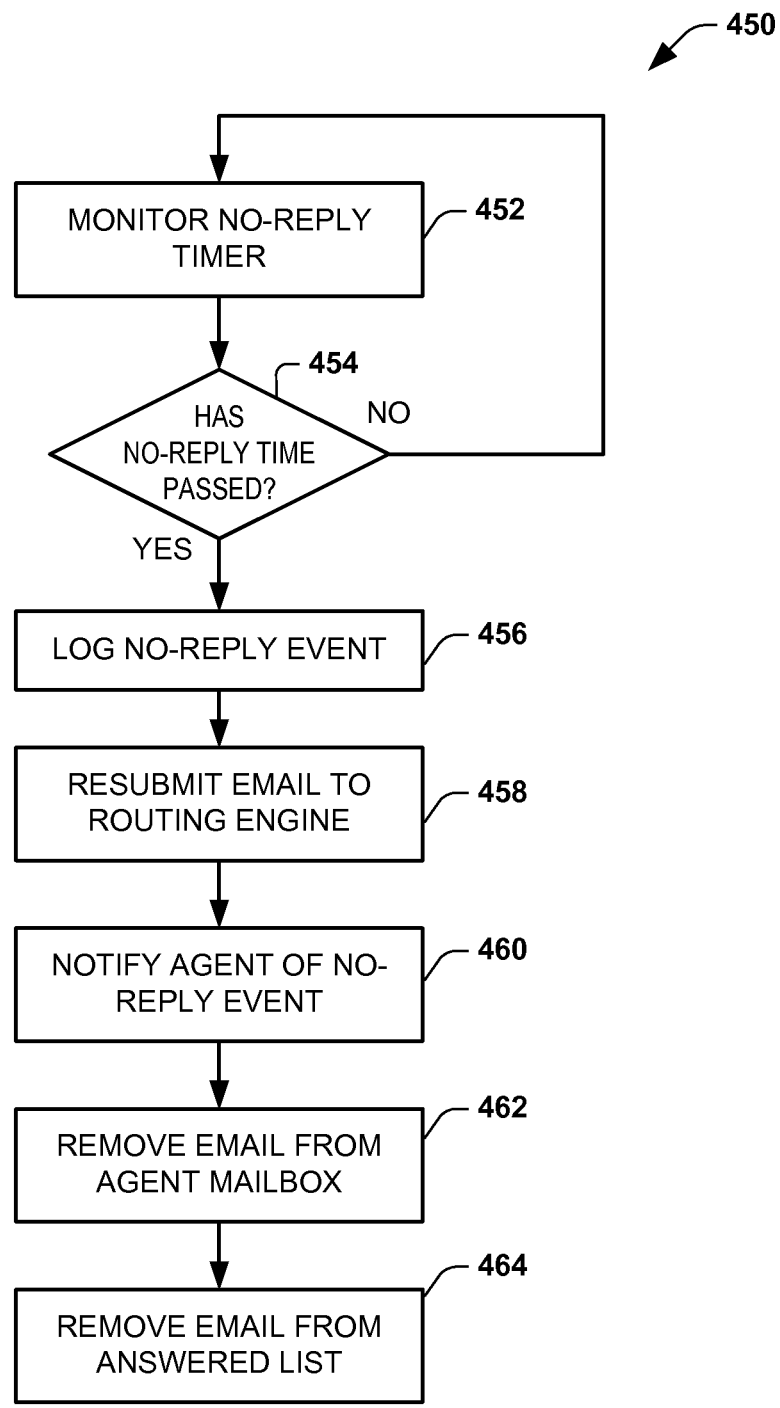
FIG. 8 is a flow diagram for processing a no-reply event.

FIG. 8 depicts an example of a method 450 that can be implemented (e.g., by the no-reply method 98 of FIG. 2) in a contact center system if an agent fails to timely reply to each email that has been answered. For example, the handling control of the contact center system can employ a no-reply timer that starts when an email arrives in the inbox and a no-reply time can be set to establish timeliness requirements for replying to emails. Each email can have a no-reply time that establishes a maximum time for an agent to respond to a contact email. The no-reply time can be set based on, for example, the inbox to where the email was sent, the prioritization of the email or other information (e.g., contact identify, account type or the like).

At 452, the no-reply time is monitored for the email. This is done for each email that exists on the answered list (e.g., following delivery to the agent of FIG. 7). At 454 a determination is made whether the no-reply time has passed. If the no-reply time for the given email has not yet passed, the method can loop back to 452 to continue monitoring the no-reply timer for the given email to afford the agent an opportunity to respond. If the no-reply time has passed, however, the method proceeds to 456 in which a no-reply event can be logged, such as by storing information (e.g., contact name, date, time, agent identity and the like) about the failure for the answering agent to reply within the prescribed time period. At 458, the email can be resubmitted to the routing engine (e.g., routing engine 82 of FIG. 2). In this way, the routing engine can employ routing rules to select another agent to whom the email can be routed (see, e.g., FIG. 6). Additionally, at 460, the contact center system can notify the agent of the no-reply event. The notification can be via email or other message formats, telephone call, text message, facsimile or the like. If sufficient controls have been enabled and agent email user name passwords have been defined for the agent's email client, at 462, the email can also be removed from the agent's mailbox. This can be done to help ensure that the agent does not reply after the email has been removed from the agent's responsibilities. At 464, the email is also removed from the answered list. Since the email has not been replied to within the prescribed time period, as set by the no-reply time, the priority of the email can also be increased in the email tracking data structure to help ensure a prompt response when the email is reassigned to another agent.

Figure 9:
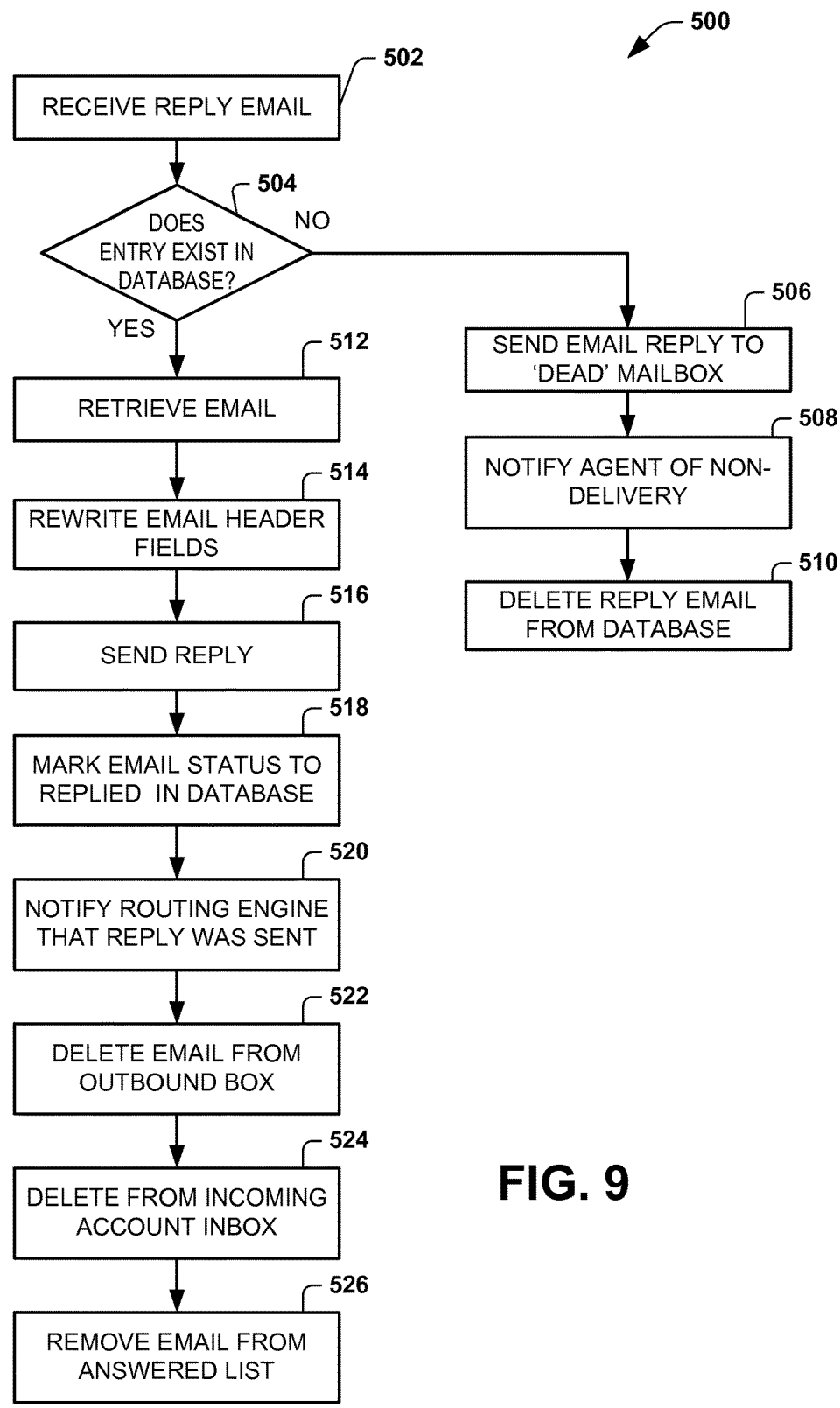
FIG. 9 is a flow diagram depicting an example method for handling a reply email from an agent.

FIG. 9 depicts an example of a method 500 that can be implemented (e.g., by the reply method 92 of FIG. 2) in a contact center system if an agent replies in a timely manner to an email. As described herein, the tracking data structure (see, e.g., FIG. 3) stores agent assignment data that identifies which agent is authorized to reply to each email. The tracking data structure also includes data that tracks all emails and their status for each email interaction. This bookkeeping data thus can be utilized by the email handling control to help ensure that duplicate replies do not occur.

At 502, an email reply is received from an agent, such as in response to be sent from the agent to the contact center outbound box. For example, a reply action at an email client of the agent sends the email to the contact center's designated outbound box in the enterprise email system. This occurs since the email header fields had been rewritten when the email was sent to the agent (see, e.g., FIG. 7). At 504, a determination is made whether an entry exists in the contact center database for the email. For example, this determination can be implemented by querying the contact center database for an email record matching an interaction GUID that is provided in the header of the email received at 502. If no entry exists in the database, the method proceeds to 506 and the email reply is sent to the 'dead' mailbox. If no entry exists, it can be inferred that the email interaction has been completed as it has already been deleted from the database, such as in response to a reply already being sent. In this way, the contact center system can ensure that a single reply is sent. At 506, the agent can be notified that the email will not be delivered. The reply email can also be deleted from the database, including interaction data corresponding to the reply email.

If it is determined at 504 that an entry does exist in the database for the reply email, the method proceeds to 512 and the email is retrieved, such as by employing an IMAP instruction (e.g., IMAP4R1:Fetch) to the outbox. At 514, the email header fields are rewritten based on the interaction data, such that the reply email is addressed to the originating contact email address and is being sent from the incoming mailbox to where the original contact email had been sent. At 516, the re-addressed email is sent to the contact.

When the email is sent, housekeeping activities can be performed. At 518, the email status can be marked to 'replied' status in the email tracking data of contact center database. At 520, the routing engine can be notified that the reply was sent, such that the no-reply method (FIG. 8) can be terminated for the email. At 522, the email can be deleted from the outbound email box, and at 524 the corresponding email is also deleted from the incoming box. At 526, the email is removed from the answered list, and the interaction with the email can be considered complete.

Figure 10:
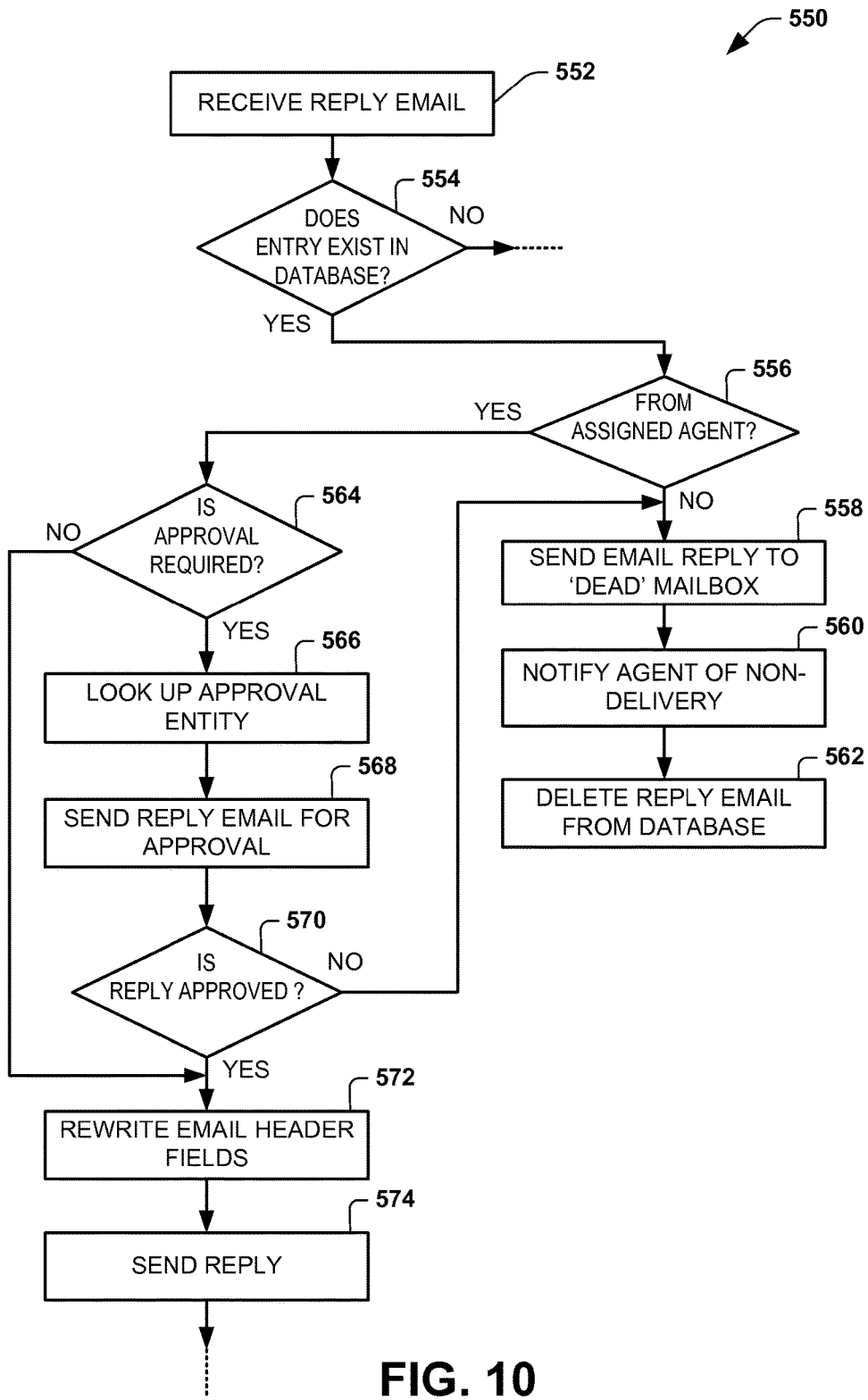
FIG. 10 is a flow diagram depicting an example of additional processing that may be performed for handling a reply email from an agent.

FIG. 10 depicts some additional features that can be implemented in conjunction with the method 500 for handling reply emails disclosed with respect to FIG. 9. In particular, FIG. 10 demonstrates examples of methods that can be implemented to ensure that the reply is from the assigned agent and to implement an approval process for a reply email. Certain parts of the method 550, which have been previously described with respect to the method 500 of FIG. 9, have been omitted for sake of brevity.

The method 550 begins at 552 in which an email reply is received from an agent, such as in response to being sent from the agent to the contact center outbound box. At 554, a determination is made whether an entry exists in the contact center database for the email (e.g., by querying the contact center database). If no entry exists in the database, the method proceeds as though the email reply has already been sent (see, e.g., 506, 508 and 510 of FIG. 9). Additionally or alternatively, email tracking data can be queried to explicitly determine if a corresponding reply had been sent.

In this example, if an entry exists in the database for the reply email (e.g., the interaction GUID for the reply email matches another active interaction in the tracking data structure), the method proceeds to 556. At 556, a determination is made whether the reply email is sent from the assigned agent. For example, the "from:" header field in the reply email can be compared to the agent assignment data (e.g., an email address) in the tracking data structure based on the interaction GUID. If the reply is not sent from the assigned agent, the method can proceed from 556 to 558 and the reply email can be sent to the 'dead' mailbox. At 560, the sending agent can be notified of the non-delivery of its reply email, such as via email or other messaging modality. At 562, the reply email can be deleted from the contact center database.

If the reply email is from the assigned agent, the method can proceed from 556 to 564 to determine if approval is required. For example, when a contact email is received, the handling control can set an approval entry in the tracking data structure to specify whether approval is required, such as can be based on the email priority, contact or account information for the sender. Alternatively, or additionally, the decision to require approval can be based on attributes of the agent, such as the agent's status (e.g., length of employment, probationary period or the like).

If approval is required before sending the reply email (YES), at 566, a look-up can be performed to identify the approval entity. For example, the approval entity can be a supervisor of the assigned agent or other authorized personnel. One or more approval entities thus can be specified for each agent, which can be stored in the contact center database as part of the agent profile data for each agent. At 568, the reply email can be sent to the approval entity for approval. This can be sent by rewriting the header fields and sending the reply to the approval entity or by otherwise sending the reply or a link to the reply.

At 570, a determination is made whether the email is approved for sending. If the reply email is not approved, the method can proceed to 558 for attending to appropriate housekeeping (sending the reply to the dead box, notifying the agent, and deleting the reply email). If the email is approved at 570, the method can proceed to 572 where the email header fields can be rewritten and the reply email can be sent to the contact at 574. As an example, the approval may involve simple approving or not approving by the approval entity. Alternatively, an approval entity may be afforded the ability to modify the email content as part of the approval process, such that a corresponding revised version of the reply email can be sent as the approved email at 574. From 574, the method 550 can proceed similarly to as disclosed in relation to 518-526 of FIG. 9, as schematically demonstrated by dotted lines.

Figure 11:
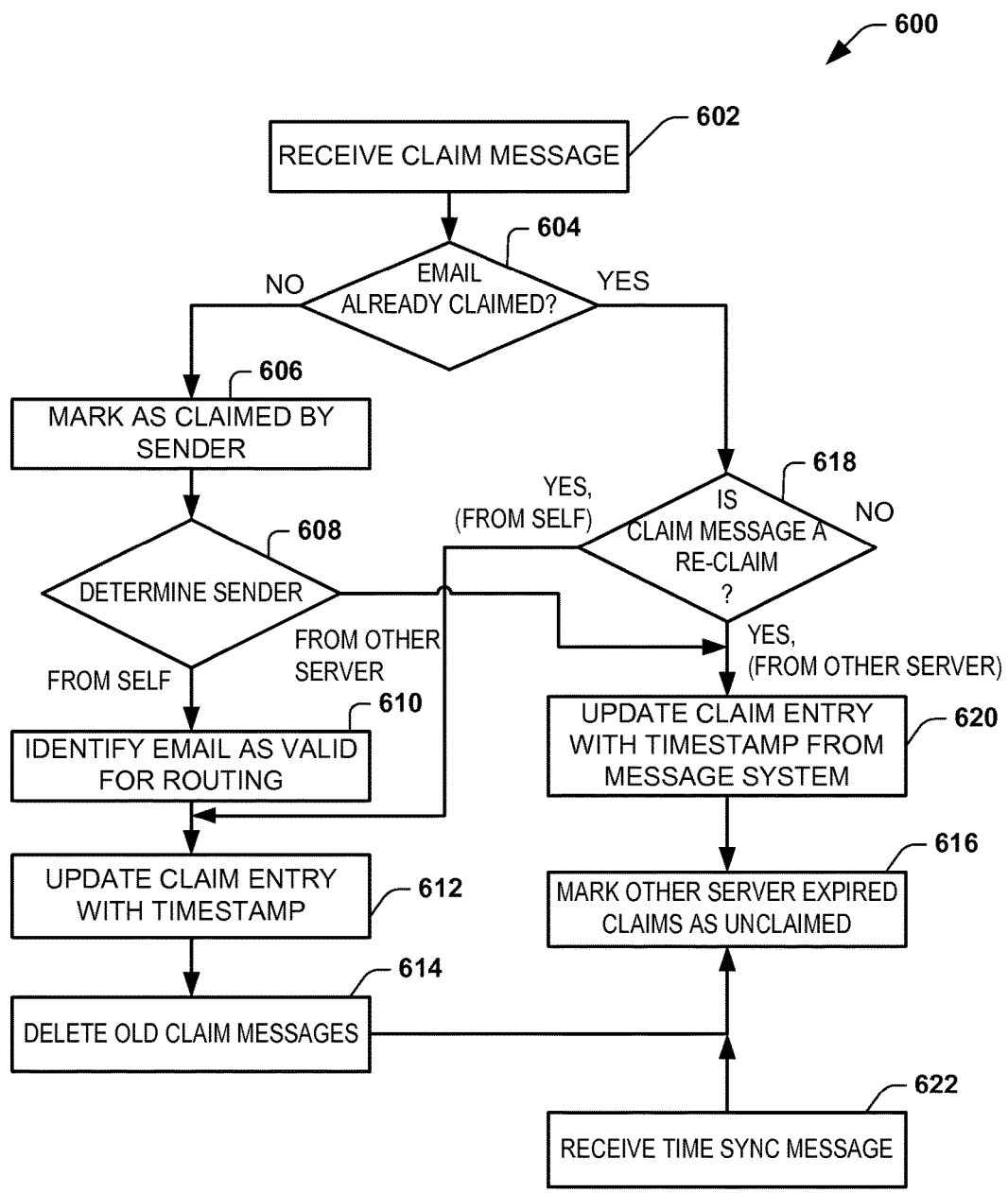
FIG. 11 is a flow diagram for processing claims to emails in a contact center.

FIG. 11 depicts an example method that can be implemented (e.g., by synchronization control 220 of FIG. 4) in a contact center system for controlling claim ownership of an email that is being processed. For example, it may become necessary to assert a claim to an email, such as if an enterprise implements more than one contact center system (e.g., for providing back-up or redundancy). As disclosed with respect to FIG. 4, during normal operation, the plural contact center systems can operate with defined roles in which a selected contact center system is the primary (or master) and the other is a secondary (or slave) contact center. The slave thus includes a replicated contact center database, but does not operate in an active role during this normal operation. During an island mode, such as when the direct communication link between contact center systems does not exist or the primary otherwise fails, each contact center can operate as a master (in an island mode) for processing emails from the same enterprise email system.

FIG. 11 thus corresponds to a method 600 that can be implemented at each contact center system during island mode operation to claim ownership for emails that are being processed. At 602, a claim message is received. The claim message, for example, can be an email that is sent by a claimant contact center to a predetermined email address in the enterprise email system (e.g., claim.message.sync@xyzcorp.com). Thus, each of the plural contact centers can send claim messages to the same claim address. At 604, a determination is made as to whether the email that is identified in the claim message has already been claimed. To facilitate this determination, the claim message can include identification information for the email being claimed (e.g., an email GUID, an interaction GUID or the like). The identification information can be used to query the tracking data structure in the respective contact center's database (e.g., based on the email GUID in the tracking data structure). If it is determined that the email has not been claimed, the method proceeds to 606 in which an entry in the contact center database for the email is marked as being claimed by the sender of the claim message.

At 608, the sender of the email is determined from the claim message. If the sender is the contact center system implementing the method (itself), the method proceeds to 610 and the email is validated for routing based on the routing methods disclosed herein (see, routing method 80 of FIG. 2). At 612, the claim entry in the tracking data structure for the email claim is marked with a corresponding timestamp, such as the arrival time for the claim message.

At 614, old claim messages can be deleted from the database. For example, claim messages greater than a predetermined expiration time period (e.g., 60 minutes) can be deleted. From 614, the method can proceed to 616 in which the other contact center's claims that have expired can be deleted (e.g., based on a predetermined expiration period).

If the email identified in the claim message has not already been claimed at 604, the method can proceed to 618. At 618, a determination can be made whether the claim message is a re-claim for reasserting an existing claim to an email interaction by the existing holder. If the claim message is not a re-claim (NO), no action needs to be taken with respect to the claim message. If the message is a re-claim from the contact center implementing the method 600 (itself), the method proceeds from 618 to 612 and the claim timestamp is updated. If the message is a re-claim from a different contact center than the one implementing the method 600, the method proceeds from 618 to 620. At 620, the claim entry in the contact center's database is updated, including timestamp information, based on the information in the message system. From 620 the method proceeds to 616 in which the other server's expired claims are marked as unclaimed, such that the contact center can itself claim the message and issue a corresponding claim message.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A contact center system that includes memory to store program instructions, the contact center system comprising:
   an email interface to access an enterprise email system to process a plurality of email interactions;
   an email tracking data structure stored in the memory, the email tracking data structure programmed to store tracking data corresponding to each email interaction that is processed by the email interface; and
   an email handling control that is stored in the memory, the email handling control programmed to control sending a single reply email to a given incoming contact email that is sent to the contact center system in response to ascertaining that the tracking data indicates active email interaction between the contact center system and a given contact from which the given incoming contact email is received by the contact center system, and
   wherein the email handling control is further programmed to receive a reply email from an agent and perform a verification by accessing the tracking data to verify whether the single reply email has already been sent, the verification is based on a matching of a global unique identifier (GUID) value in a header of the agent reply email to a GUID value for the email interaction stored in the tracking data.

2. The contact center system of claim 1, wherein the email handling control is programmed to alter fields of the single reply email such that further replies associated with the email interaction corresponding to the single reply email are sent to the contact center email address.

3. The contact center system of claim 1, wherein the email handling control is further programmed to either send or not send the reply email as the single reply email based on the verification.

4. The contact center system of claim 1, wherein the verification is based on assignment data stored in the tracking data, wherein the assignment data identifies a selected agent to which a given email interaction is assigned for response.

5. The contact center system of claim 1, wherein the email handling control further comprises an approval component programmed to condition sending the single reply email contingent on receiving approval from another agent.

6. The contact center system of claim 1, wherein the email handling control further comprises a priority calculator programmed to determine a priority for the single reply email different from a serialization of emails received by the email interface.

7. The contact center system of claim 1, wherein the email handling control is further programmed to modify assignment data in the email tracking data structure for a given incoming email from a first agent to a second agent if the first agent fails to send the single reply email within a predetermined time.

8. A method for handling email for a contact center system:
   receiving a reply email from an agent that is in response to an incoming client email;
   accessing tracking data, stored in memory, associated with the incoming client email, wherein the tracking data comprises interaction data values for the incoming client email;
   verifying that the reply email should be sent for the incoming client email based on the tracking data indicating an active email interaction between the contact center system and a given contact from which the incoming client email is received by the contact center system; and sending the reply email in response to the incoming client email based on the verifying, wherein the verifying further comprises determining whether the reply email has already been sent to the recipient in response to the incoming client emit based on the tracking data, and the verifying is based on a matching of a global unique identifier (GUID) value in a header of the reply email to the GUID value stored in the tracking data.

9. The method of claim 8, wherein the verifying ensures that only a single reply email is sent in response to the incoming client email.

10. The method of claim 8, wherein the sending further comprises altering fields of the reply email so that the reply email appears to come from the contact center email address.

11. The method of claim 8, wherein the verifying is based on assignment data identifying to which of a plurality of agents a given email interaction is assigned for response, wherein the assignment data is stored in the tracking data.

12. The method of claim 11, wherein the verifying further comprises conditioning the sending the reply email contingent on receiving approval from an identified agent, wherein the reply email is from a different agent than the identified agent.

13. The method of claim 11, further comprising modifying the assignment data in the tracking data from a first agent to a second agent if the first agent fails to send the reply email within a predetermined time.

14. The method of claim 13, wherein the reply email is a first reply email from a first of a plurality of different agents, the method further comprising:

receiving a second reply email to the incoming client email from the second agent of the plurality of agents;

sending only one of the first and the second reply emails in response to the incoming client email based on the verifying; and adjusting the assignment data according to which one of the first and the second reply emails is sent.

* * * * *